Figure 1:
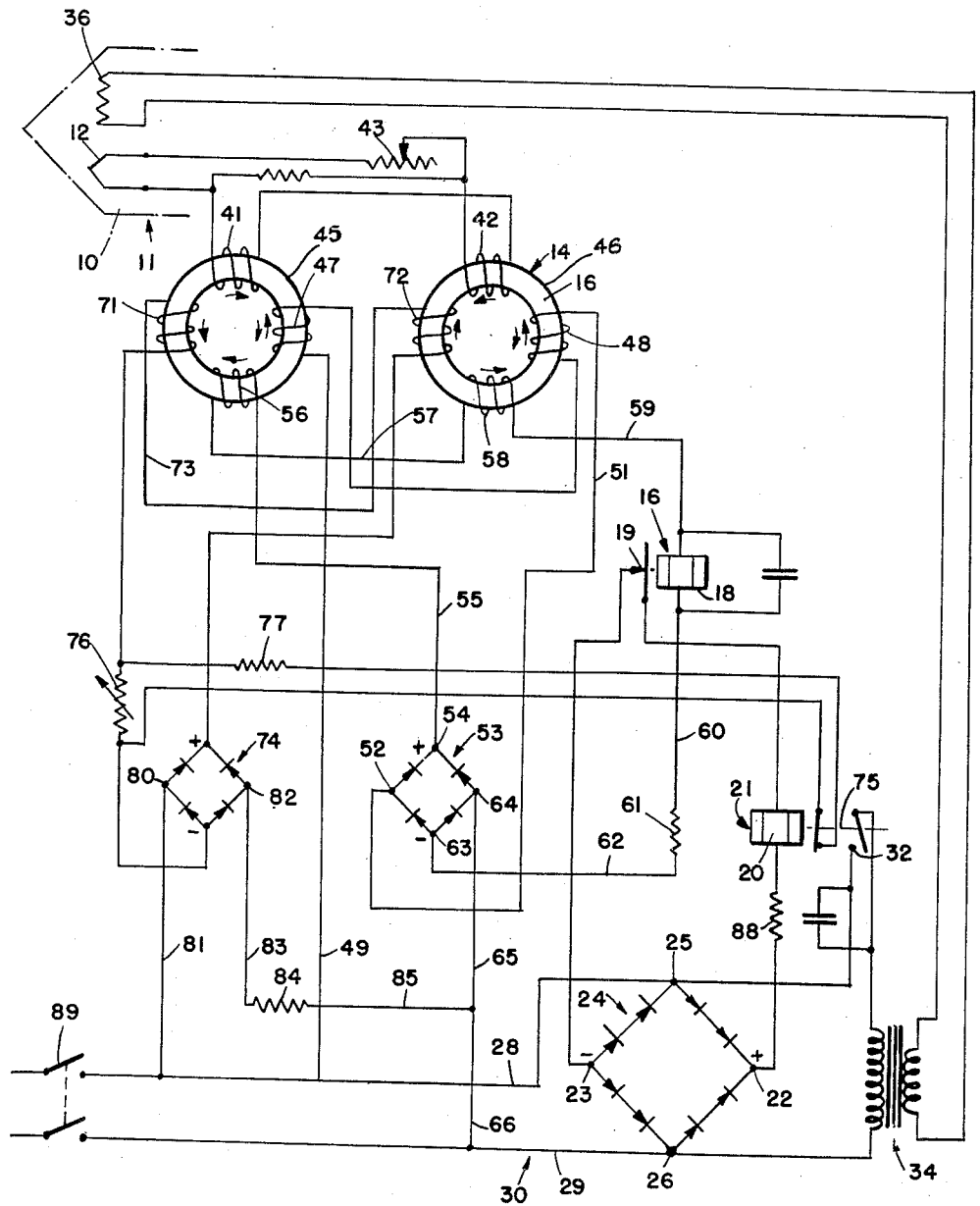

April 19, 1955

G. A. MITCHELL 2,706,764

CONTROL CIRCUITS

Filed March 20, 1952

2 Sheets-Sheet 1

INVENTOR:
G. A. MITCHELL
BY
ATTORNEY

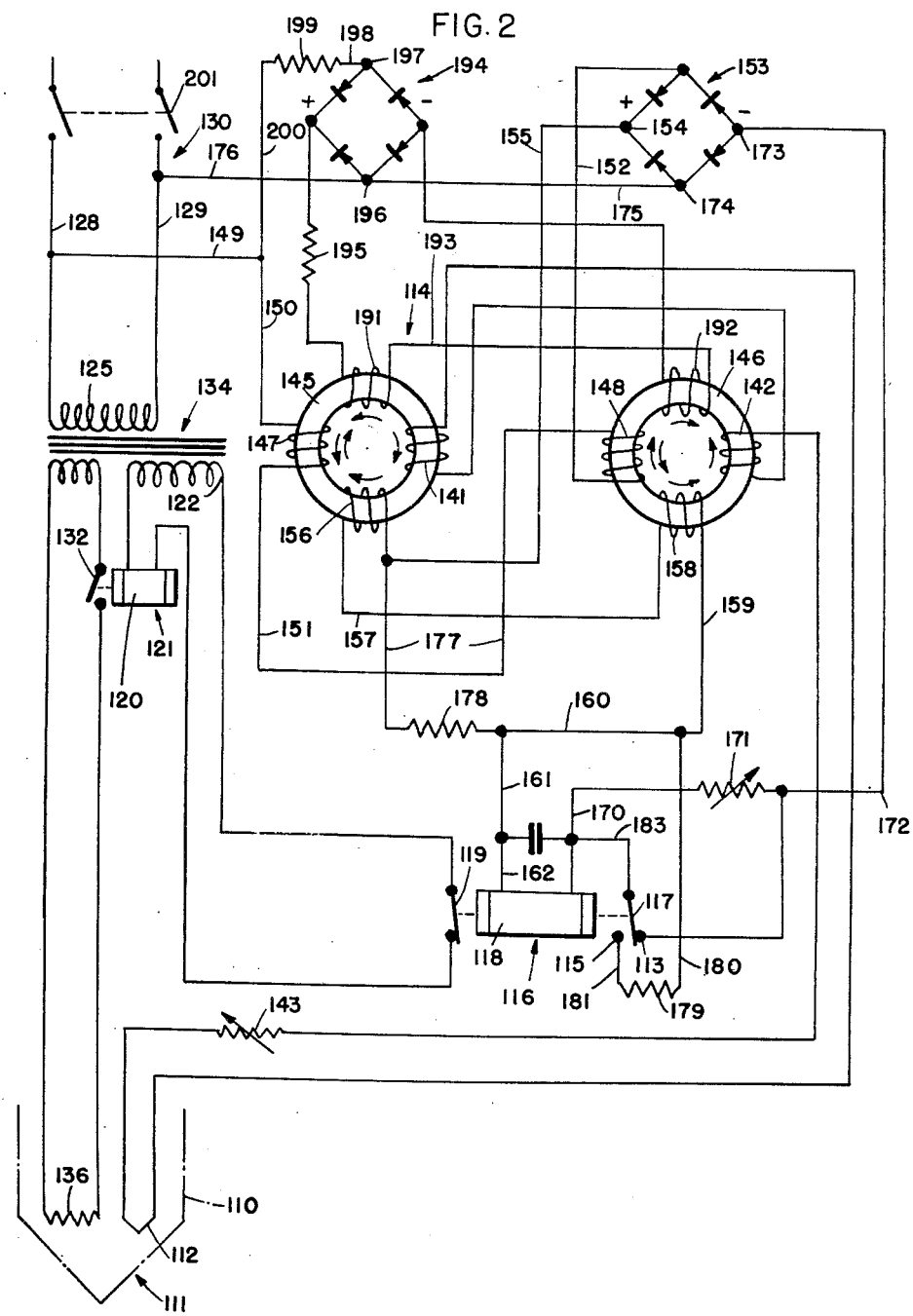

United States Patent Office 2,706,764
Patented Apr. 19, 1955

2,706,764

CONTROL CIRCUITS

Gerald A. Mitchell, Maywood, Ill., assignor to Western Electric Company, Incorporated, New York, N. Y., a corporation of New York Application March 20, 1952, Serial No. 277,691

14 Claims. (Cl. 219—20)

This invention relates to control circuits, and more particularly to circuits for controlling the supply of power to heating elements of soldering irons, or the like.

In the use of soldering irons which are heated by electrical resistance, it is desirable to heat the iron quickly to a working temperature and maintain that temperature with a minimum of power. Various control circuits for effecting this have been proposed, but none have been effective to both keep the temperature of the soldering irons within a narrow range and rapidly heat the soldering irons to the desired temperature when they are started in use.

An object of the invention is to provide new and improved control circuits.

Another object of the invention is to provide new and improved circuits for controlling the supply of power to heating elements of soldering irons, or the like.

A further object of the invention is to provide control circuits for heating soldering irons to working temperatures rapidly, and for maintaining the soldering irons within a narrow optimum range of temperatures.

In accordance with one embodiment of the invention, there may be provided a heating element for a soldering iron, or the like, supplied with power from a power source. A thermocouple responsive to the temperature of the element to be heated is connected to a control winding of a magnetic amplifier having a bias winding, an output winding and a feedback winding. Relay means responsive to the output winding of the magnetic amplifier serve to cut off the power source to the heating element when the soldering iron is at a maximum temperature desired and connect the power supply to the heating element when the temperature of the iron drops to the minimum desired. Current limiting means and means for shunting the current limiting means are provided in the circuit to keep the differential of the relay drop low.

A complete understanding of the invention may be obtained from the following detailed description of circuits forming specific embodiments thereof, when read in conjunction with the appended drawings, in which Fig. 1 is a schematic view of a control circuit forming one embodiment of the invention, and Fig. 2 is a schematic view of a control circuit forming an alternative embodiment of the invention.

Referring now in detail to the drawings, there is shown in Fig. 1 an apparatus for controlling the temperature of a tip 10 of a soldering iron 11. The apparatus includes a thermocouple 12 located in the tip of the iron so that the temperature of the thermocouple follows closely that of the tip. The thermocouple acts through a magnetic amplifier 14 to control the operation of a relay 16. When a winding 18 of the relay 16 is energized, the relay opens a normally closed contact 19 thereof to break a circuit to a winding 20 of a relay 21 connected to a positive terminal 22 and a negative terminal 23 of a rectifier 24 having A. C. terminals 25 and 26 connected to conductors 28 and 29 of a power line 30 leading from a source of alternating current. This breaks a normally open contact 32 of the relay 21 to deenergize a transformer 34, thereby deenergizing a resistance heating element 36 mounted in the tip 10 of the soldering iron 11.

The magnetic amplifier 14 includes control windings 41 and 42 connected in series to the thermocouple 12 and an adjustable resistance 43 and designed, from current from the thermocouple, to create flux in cores 45 and 46 composed of high permeability material in the directions of the arrows adjacent thereto. Output windings 47 and 48 in series with one another are connected to the power line 30 by conductors 49, 50 and 51, an A. C. terminal 52 of a rectifier 53, a positive terminal 54 of the rectifier 53, a conductor 55, a feedback winding 56, a conductor 57, a second feedback winding 58, a conductor 59, the relay winding 18, a conductor 60, a resistance 61, a conductor 62, a negative terminal 63 of the rectifier 53, an A. C. terminal 64 of the rectifier 53 and conductors 65 and 66. The inductive reactance of the output windings 47 and 48 is high when the cores 45 and 46 are not saturated, and is low when these cores are saturated. When the cores are not saturated, the relay 16 is not actuated, and when the cores are saturated, the relay 16 is actuated.

To oppose the flux created by the feedback windings 56 and 58 in the directions of the arrows adjacent thereto, bias windings 71 and 72 having less turns than the feedback windings and connected in series by a conductor 73 are supplied with power from a rectifier 74 through a normally closed contact 75 of the relay 21 shunting a resistance 76 with a resistance 77 of a substantially lower value than the resistance 76 when the heating element 36 is not energized, and through the resistance 76 only when the heating element 36 is energized. The combined value of the resistances 76 and 77 in parallel is such with respect to that of the resistance 76 that the voltage across the bias windings 71 and 72 is higher when there is no power on the heating element 36 than when there is power on the element 36. This has the effect of causing the relay 16 to drop out earlier on cooling of the iron 11 than it otherwise would, inasmuch as the increased current in the windings 71 and 72 bring the cores 45 and 46 back to non-saturation sooner than with the lower current when the resistance 76 is not shunted, thereby keeping the range of temperature of the tip 10 of the soldering iron 11 narrow and optimum.

An A. C. terminal 80 of the rectifier 74 is connected to the conductor 28 of the power line 30 by a conductor 81, and a second A. C. terminal 82 is connected to the other power line conductor 29 by a conductor 83, a protective resistance 84 and conductors 85 and 66. The resistances 76 and 84 protect the rectifier 74 from excessive current when there is no heavy load on the power line, and the resistance 84 protects this rectifier when the load of the heating element 36 is on the power line. A resistance 88 protects the rectifier 24 against excessive currents. A manually operable switch 89 is provided in the power line 30. One of each pair of windings 41 and 42, 56 and 58 and 71 and 72 opposes the other winding insofar as alternating current induced therein by the output windings 47 and 48 so that the transformer effect on the D. C. windings is negated.

*Operation of embodiment shown in Fig. 1*

The switch 89 is closed, the tip 10 of the soldering iron 11 being cold so that there is very little thermocouple voltage, the cores 45 and 46 of the magnetic amplifier 14 are not saturated. Hence, the inductive reactance of the coils 47 and 48 is high and the relay 16 is not actuated so that the contact 19 remains closed to energize the relay winding 20. The contact 32 then is closed and the contact 75 is opened. The contact 32 connects the transformer 34 to the power line 30, and the resistance heating element 36 is energized to rapidly heat the tip 10 to its maximum temperature, which occurs within about twenty seconds by the high heating capacity of the heating element 36.

When the temperature of the tip 10 of the soldering iron 11 reaches the maximum desired therefor, the voltage of the thermocouple 12 causes sufficient current through the control windings 41 and 42 that the normal current through the output windings 47 and 48 is sufficient to bring the cores to near saturation so that the inductive reactance of the windings 46, 47, 56 and 58 is decreased thereby causing the current through the windings 46, 47, 56 and 58 to increase, the feedback windings 56 and 58 causing further saturation of the cores. This process continues until an equilibrium is reached. Due to the increased current permitted by the output and feedback windings, the relay winding 18 is energized sufficiently to break the contact 19.

When the contact 19 is broken, the relay winding 20 of the relay 21 is deenergized to break the contact 32 and make the contact 75 and to open the power line circuit to the transformer 34 and close the circuit shunting the resistance 76. The iron tip 10 and the thermocouple then start to cool, and the voltage of the power line comes back immediately to its no load value. This causes increased current through the bias windings 71 and 72, and, although the higher line voltage increases the current through the feedback windings 56 and 58, the shunting of the resistance 76 causes the bias windings to bring the cores 45 and 46 closer to non-saturation immediately. Then, as the current in the control windings 41 and 42 decreases as the thermocouple 12 cools, the cores become less saturated. This increases the inductive reactance of the output windings 47 and 48 and the feedback windings 56 and 58, which decreases the current in these windings to bring the cores closer to non-saturation. This continues until the relay winding 18 receives insufficient current to keep the contact 19 broken, and the relay 18 drops out. This causes energization of the relay winding 20 to make contact 32 and break contact 75 to again start the heating portion of the cycle.

*Alternative embodiment (Fig. 2)*

This apparatus controls the temperature of a tip 110 of a soldering iron 111, and includes a thermocouple 112 located in the tip of the iron so that the temperature of the thermocouple follows closely that of the tip. The thermocouple acts through a magnetic amplifier 114 to control the operation of a relay 116. When a winding 118 of the relay 116 is energized, the relay breaks normally closed contacts 113 and 119 and makes a contact 115 with a contactor 117 to break a circuit to a winding 120 of a relay 121 connected to a secondary winding 122 of a transformer 134 having a primary winding 125 connected to conductors 128 and 129 of a power line 130 leading from a source of alternating current. This breaks a normally open contact 132 of the relay 121 to deenergize a resistance heating element 136 mounted in the tip 110 of the soldering iron 111.

The magnetic amplifier 114 includes control windings 141 and 142 connected in series to the thermocouple 112 and an adjustable resistance 143. The windings 141 and 142 are designed, from current from the thermocouple, to create flux in cores 145 and 146 composed of high permeability material in the directions of the arrows adjacent thereto. Output windings 147 and 148 in series with one another are connected to the power line 130 by conductors 149, 150, 151 and 152 connected to an A. C. terminal of a rectifier 153, a positive terminal 154 of the rectifier 153, a conductor 155, a feedback winding 156, a conductor 157, a second feedback winding 158, conductors 159, 160, 161 and 162, the relay winding 118, a conductor 170, an adjustable resistance 171, a conductor 172, a negative terminal 173 of the rectifier 153, an A. C. terminal 174 of the rectifier 153 and conductors 175 and 176. A conductor 177 and a resistance 178 connected to the conductor 155 are connected to the conductor 161 in parallel with the feedback windings 156 and 158 to shunt a portion of the current around the feedback windings, and damp secondary harmonics in the feedback windings.

A resistance 179 connected by a conductor 180 to the conductor 159 is connected in shunt with respect to the relay winding 118 by a conductor 181, the contact 115, a contactor 182 and a conductor 183 when the relay 116 is actuated. The purpose of the shunt resistance 179 and the series resistance 171 is to substantially reduce the differential value of the relay. That is, the resistances 171 and 179 cause the relay 116 to drop out much quicker than it normally would, and also maintain the resistance of the D. C. circuit of the rectifier 153 substantially constant. The inductive reactance of the output windings 147 and 148 is high when the cores 145 and 146 are not saturated, and is low when these cores are saturated. When the cores are not saturated, the relay 116 is not actuated, and when the cores are saturated, the relay 116 is actuated.

To oppose the flux created by the feedback windings 156 and 158 in the directions of the arrows adjacent thereto, bias windings 191 and 192 connected in series by a conductor 193 are supplied with a constant predetermined D. C. voltage from a rectifier 194 through a resistance 195. An A. C. terminal 196 of the rectifier 194 is connected to the power line conductor 129 by the conductor 176. A second A. C. terminal 197 of the rectifier 194 is connected to the power line conductor 128 by a conductor 198, a protective resistance 199 and conductors 200 and 149. The resistances 195 and 199 protect the rectifier 194 from excessive current, and the resistance 195 damps leakage A. C. from the D. C. terminals of the rectifier 194. A manually operable switch 201 is provided in the power line 130. The pairs of D. C. windings 141 and 142, 156 and 158 and 191 and 192 are so wound that A. C. induced in one of each pair cancels A. C. induced in the other of each pair.

The rectifier is of the copper oxide disc type which has non-linear resistance characteristics when input voltages within a certain range are utilized. The value of the resistance 199 is chosen with respect to the power line voltages at load and no load to provide a substantially constant output voltage of the rectifier 194, both when the power line is under the load of the resistance 136 and when it is not under this load.

*Operation of alternative embodiment (Fig. 2)*

The switch 201 is closed, and, the tip 110 of the soldering iron 111 being cold so that there is very little thermocouple voltage, the cores 145 and 146 of the magnetic amplifier 114 are not saturated. Hence, the inductive reactance of the coils 147 and 148 is high and the relay 116 is not actuated so that the contact 119 remains closed to energize the relay winding 120. The contact 132 then is closed. The contact 132 connects the transformer 134 to the power line 130, and the resistance heating element 136 is energized to rapidly heat the tip 110 to its maximum temperature, which occurs within about twenty seconds by the high heating capacity of the heating element 136.

As the temperature of the tip 110 of the soldering iron 111 approaches the maximum desired therefor, the voltage of the thermocouple 112 causes sufficient current through the control windings 141 and 142 that the normal current through the output windings 147 and 148 is sufficient to bring the cores to near saturation so that the inductive reactance of the windings 146, 147, 156 and 158 is decreased thereby causing the current through the windings 146, 147, 156 and 158 to increase, the feedback windings 156 and 158 causing further saturation of the cores. This process continues until an equilibrium is reached. Due to the increased current permitted by the output and feedback windings, the relay winding 118 is energized sufficiently to break the contact 119.

When the contact 119 is broken, the relay winding 120 of the relay 121 is deenergized to break the contact 132 to open the circuit to the heating element 136. The iron tip 110 and the thermocouple 112 then start to cool, and the voltage of the power line 130 comes back immediately to its no load value. This causes increased current through the bias windings 191 and 192, and the resistance 178 tends to keep the voltage across the feedback windings uniform so that the bias windings bring the cores closer to a non-saturated condition. Then, as the current in the control windings 141 and 142 decreases as the thermocouple 112 cools, the cores become less saturated. This increases the inductive reactance of the output windings 147 and 148 and the feedback windings 156 and 158, which decreases the current in these windings to bring the cores closer to non-saturation. This continues until the relay winding 118 receives insufficient current to keep the contact 119 broken, and the relay 118 drops out. This occurrence is accelerated by the circuit to the relay winding 118 shunting the resistance 171 through the contact 182, and the contact 113 being broken while the relay 116 is actuated and the resistance 179 being brought into shunting relationship with respect to the relay winding 118 while the relay 116 is actuated. When the relay 116 drops out, the contact 119 closes to cause energization of the relay winding 120 to make the contact 132 to again start the heating portion of the cycle. The effect of breaking the circuit shunting the resistance 171, and the resistance 179 being brought into shunting relationship with respect to the relay winding 118 is to cause the relay 116 to drop out at a higher temperature of the iron tip 110 than it otherwise would, thereby making the range of temperature of the tip 110 quite narrow.

The above-described circuits permit heating elements of high capacities to be used with light soldering iron tips without burning out the tips. With such arrangements, light tips have even greater soldering capacities than heavy tips of the conventional type. These circuits maintain soldering iron tips at temperatures within any desired narrow range and are rugged and durable while inexpensive in initial cost and maintenance. The power loss from the control portions of the circuits are very small.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A control circuit, which comprises an A. C. power source, an electrical element to be controlled, relay means for connecting the element to be controlled to the power source and for disconnecting the same, a magnetic amplifier having a saturable permeable core, a control winding and an output winding connecting the power source to the relay means, impedance means, means electrically responsive to the condition of the element to be controlled for impressing voltage on the control winding in accordance with the condition of said element and means responsive to the operation of the relay means for connecting the impedance means in series with the control winding of the magnetic amplifier at one time and shunting the impedance means at another time.

2. A control circuit, which comprises an A. C. power source, a heating element to be controlled, means for connecting the heating element to the power source and for disconnecting the same, thermocouple means electrically responsive to the condition of the heating element to be controlled, a magnetic amplifier having a saturable permeable core, a control winding connected to the thermocouple means, a feedback winding and an output winding connecting the power source to the connecting means, impedance means, means connecting the impedance means in series with the feedback winding of the magnetic amplifier and the power source to reduce the degree of saturation of the core, and means for shunting the impedance means when the heating element is not connected to the power source.

3. A circuit for controlling the temperature of an electrical soldering iron, which comprises a resistance for heating the soldering iron, a thermocouple responsive to the temperature of the soldering iron, an A. C. power line, relay means for connecting the resistance to the power line when not actuated and disconnecting the resistance from the power line when actuated, a magnetic amplifier having a saturable core, a control winding supplied with power from the thermocouple and an output winding connected to the power line for limiting current to the relay means to a non-actuating value when the voltage of the thermocouple is below a predetermined value and permitting current of an actuating value when the voltage of the thermocouple is above a predetermined value, and means actuable by the relay means for regulating voltage applied to the magnetic amplifier from the power line in such a manner as to bring the amplifier closer to a non-saturated condition when the resistance is connected to the power line.

4. A circuit for controlling the temperature of an electrical soldering iron, which comprises a resistance for heating the soldering iron, a thermocouple responsive to the temperature of the soldering iron, an A. C. power line, relay means for connecting the resistance to the power line when not actuated and disconnecting the resistance from the power line when actuated, a magnetic amplifier having a saturable core, a bias winding, a control winding supplied with power from the thermocouple and an output winding connected to the power line for limiting current to the relay means to a non-actuating value when the voltage of the thermocouple is below a predetermined value and permitting current of an actuating value when the voltage of the thermocouple is above a predetermined value, a second rectifier means connecting the bias winding to the power line in series with the second resistance, and means actuable by the relay means for shunting the second resistance when the heating resistance is not connected to the power line.

5. A circuit for controlling the temperature of an electrical soldering iron, which comprises a resistance for heating the soldering iron, a thermocouple responsive to the temperature of the soldering iron, an A. C. power line, relay means having a predetermined current differential for connecting the resistance to the power line when not actuated and disconnecting the resistance from the power line when actuated, a magnetic amplifier having a control winding supplied with power from the thermocouple and an output winding connected to the power line for limiting current to the relay means to a non-actuating value when the voltage of the thermocouple is below a predetermined value and permitting current of an actuating value when the voltage of the thermocouple is above a predetermined value, and means for lowering the current differential of the relay means.

6. A control circuit, which comprises a power source, a heating resistance, relay means for connecting the resistance to the power source, a thermocouple responsive to heat from the resistance, magnetic amplifying means responsive to the thermocouple for actuating the relay means to disconnect the resistance from the power source when the thermocouple is at a predetermined temperature, and impedance means operable by actuation of the relay means for limiting current to the relay means to cause the relay means to drop out earlier than the relay means would otherwise drop out.

7. A control circuit, which comprises an A. C. power source, an electrical heating element, relay means normally connecting the heating element to be controlled to the power source for disconnecting the heating element from the power source, a magnetic amplifier having a saturable core, a control winding and an output winding connected to the power source and the relay means for limiting current to the relay means, a thermocouple responsive to heat from the heating element connected to the control winding for causing saturation of the core when heated to a predetermined temperature to reduce the inductive reactance of the output windings, thereby actuating the relay means, and means operable on actuation of the relay means for reducing the saturation of the core to decrease current to the relay means, thereby narrowing the range of temperature through which the thermocouple is heated.

8. A control circuit, which comprises an A. C. power source, an electrical heating element, relay means normally connecting the heating element to be controlled to the power source for disconnecting the heating element from the power source, a magnetic amplifier having a saturable core, a control winding, a bias winding and an output winding connected to the power source and the relay means for limiting current to the relay means, a thermocouple responsive to heat from the heating element connected to the control winding for causing saturation of the core when heated to a predetermined temperature to reduce the inductive reactance of the output windings, thereby actuating the relay means, a resistance, rectifier means connecting the bias winding and the resistance to the power source in series with one another, and means operable on actuation of the relay means for shunting the resistance to reduce the saturation of the core to decrease current to the relay means, thereby narrowing the range of temperature through which the thermocouple is heated.

9. A control circuit, which comprises a heating resistance, an A. C. power line, relay means for connecting the resistance to the power line when not actuated and disconnecting the resistance from the power line when actuated, a magnetic amplifier having a permeable core, an output winding operatively connected to the power line and the relay means for controlling the actuation of the relay means, a bias winding and a control winding opposed to the bias winding for saturating the core, a thermocouple responsive to temperature created by the resistance connected to the control winding, rectifier means connecting the bias winding to the power line, and impedance means for varying the voltage applied to the bias winding inversely with respect to the voltage of the power line to narrow the range of temperature created by the resistance.

10. A control circuit, which comprises a heating resistance, an A. C. power line, relay means for connecting the resistance to the power line when not actuated and disconnecting the resistance from the power line when actuated, a magnetic amplifier having a permeable core, an output winding operatively connected to the power line and the relay means for controlling the actuation of the relay means, a bias winding and a control winding opposed to the bias winding for saturating the core, a thermocouple responsive to temperature created by the resistance connected to the control winding, rectifier means connecting the bias winding to the power line, and impedance means for increasing the voltage applied to the bias winding when the power line is under load to narrow the range of temperature created by the resistance.

11. A control circuit, which comprises an A. C. power line having a pair of conductors, a heating resistance, a relay having a winding, a normally open contact for connecting the power line to the resistance and a normally closed contact, a second relay having a winding and a normally closed contact connecting the first relay winding to the power line, a magnetic amplifier having a highly permeable core, a control winding, a bias winding and an output winding, rectifier means having D. C. terminals and A. C. terminals connected to the power line, a limiting resistance of a predetermined value connecting one end of the bias winding to one D. C. terminal of the rectifier means, means connecting the other end of the bias winding to the other D. C. terminal, a second limiting resistance of a value less than that of the first limiting resistance connected in series with the normally closed contact of the first relay means and in parallel with the first limiting resistance, a second rectifier means having a pair of A. C. terminals and a pair of D. C. terminals, conductive means connecting one of the A. C. terminals of the second rectifier means to one power line conductor, the other power line conductor to one end of the output winding and the other end of the output winding to the other A. C. terminal of the second rectifier means, conductive means connecting the winding of the second relay means to the D. C. terminals of the second rectifier means positioned in close proximity to the heating resistance, a thermocouple, and means connecting the thermocouple to the control winding.

12. A control circuit, which comprises an A. C. power line having a pair of conductors, a heating resistance, a relay having a winding, a normally open contact for connecting the power line to the resistance and a normally closed contact, a second relay having a winding and a normally closed contact connecting the first relay winding to the power line, a magnetic amplifier having a highly permeable core, a control winding, a bias winding, a feedback winding and an output winding, rectifier means having D. C. terminals and A. C. terminals connected to the power line, a limiting resistance of a perdetermined value connecting one end of the bias winding to one D. C. terminal of the rectifier means, means connecting the other end of the bias winding to the other D. C. terminal, a second limiting resistance of a value less than that of the first limiting resistance connected in series with the normally closed contact of the first relay means and in parallel with the first limiting resistance, a second rectifier means having a pair of A. C. terminals and a pair of D. C. terminals, conductive means connecting one of the A. C. terminals of the second rectifier means to one power line conductor, the other power line conductor to one end of the output winding and the other end of the output winding to the other A. C. terminal of the second rectifier means, conductive means connecting the feedback winding and the winding of the second relay means in series with one another and the D. C. terminals of the second rectifier means positioned closely to the heating resistance, a thermocouple, and means connecting the thermocouple to the control winding.

13. A control circuit for an electrical heating device, which comprises an A. C. power line, a heating element, a relay having a winding, a normally closed contact for connecting the heating element to the power line, a second contact, a third contact and a contactor normally in engagement with the third contact and movable into engagement with the second contact when the relay is actuated, a magnetic amplifier having a control winding, an output winding connected to the power line and a feedback winding, rectifier means connecting the feedback winding in series with the output winding, a thermocouple responsive to heat from the heating element connected to the control winding, a resistance, a second resistance, means connecting the contactor and the second contact on the one hand and the first resistance on the other hand in parallel with one another and in series with the relay winding and the feedback winding, and means connecting the second resistance and the third contact to the feedback winding in parallel with the relay winding.

14. A control circuit for an electrical heating device designed to be energized from an A. C. powerline and including a heating element and a thermocouple positioned closely thereto, which comprises relay means for connecting the heating element to the powerline, a magnetic amplifier connectible to the powerline for controlling the actuation of the relay means and including an output winding controlling the actuation of the relay means, a control winding connected to the thermocouple, a feedback winding and a bias winding, rectifier means supplying power from the powerline to feedback winding, a resistance, and a copper oxide disc rectifier connected in series with the resistance, the powerline and the bias winding for regulating voltage from the powerline to the bias winding.

References Cited in the file of this patent

UNITED STATES PATENTS

| Number | Name | Date |
|---|---|---|
| 915,974 | Leonard | Mar. 23, 1909 |
| 1,582,702 | Stoekle et al. | Apr. 27, 1926 |
| 1,730,254 | Thomas | Oct. 1, 1929 |
| 1,910,381 | Dowling | May 23, 1933 |
| 2,086,120 | Croden | July 6, 1937 |
| 2,216,595 | McCarty | Oct. 1, 1940 |
| 2,266,569 | Schneider et al. | Dec. 16, 1941 |
| 2,429,827 | Lamm | Oct. 28, 1947 |
| 2,568,411 | Reed | Sept. 18, 1951 |
| 2,608,635 | Mershon | Aug. 26, 1952 |